(12) United States Patent
Varrin

(10) Patent No.: US 12,548,685 B2
(45) Date of Patent: Feb. 10, 2026

(54) METHOD AND APPARATUS FOR IMPROVED REMOVAL AND RETENTION OF RADIOACTIVE PARTICULATES FROM FLUIDS

(71) Applicant: VRD, LLC, Reston, VA (US)

(72) Inventor: Robert Varrin, Reston, VA (US)

(73) Assignee: VRD, LLC, Reston, VA (US)

( * ) Notice: Subject to any disclaimer, the term of this patent is extended or adjusted under 35 U.S.C. 154(b) by 941 days.

(21) Appl. No.: 17/606,387

(22) PCT Filed: Apr. 23, 2020

(86) PCT No.: PCT/US2020/029494
§ 371 (c)(1),
(2) Date: Oct. 25, 2021

(87) PCT Pub. No.: WO2020/219657
PCT Pub. Date: Oct. 29, 2020

(65) Prior Publication Data
US 2022/0215978 A1    Jul. 7, 2022

Related U.S. Application Data

(60) Provisional application No. 62/837,294, filed on Apr. 23, 2019.

(51) Int. Cl.
*B01D 61/20* (2006.01)
*B01D 65/02* (2006.01)
(Continued)

(52) U.S. Cl.
CPC ........... *G21C 19/307* (2013.01); *B01D 61/20* (2013.01); *B01D 65/02* (2013.01); *G21F 9/12* (2013.01);
(Continued)

(58) Field of Classification Search
CPC ............... B01D 65/02; B01D 2321/04; B01D 2321/2075; C02F 1/004; C02F 2101/006
See application file for complete search history.

(56) References Cited

U.S. PATENT DOCUMENTS 4,642,186 A    2/1987  Nakamura
6,396,892 B1   5/2002  Frattini et al.
(Continued)

FOREIGN PATENT DOCUMENTS

EP    2188813 B9    7/2013
WO    2008151090 A1   12/2008
(Continued)

OTHER PUBLICATIONS

W Aperador et al., "Diagnostic of the Erosion Corrosion Evolution by Cavitation of [TIN-TiAIN] 200 Thin Coatings", Int. J. Electrochem. Sci. International Journal, pp. 3876-3884 (Jan. 2014).
(Continued)

*Primary Examiner* — Bradley R Spies
(74) *Attorney, Agent, or Firm* — FisherBroyles, LLP; Ronni S. Jillions

(57) ABSTRACT

A method and apparatus for improved separation and containment of radioactive particulates from liquids by filtration. The improvements are achieved by utilizing more than one stage of filtration to remove radioactive particulates from a fluid. The first stage of filtration is designed for high liquid flowrate, low differential pressure across the filter medium, and reversibility of flow through the medium to facilitate backwashing. The second or more stages of filtration receive the backwash flow and captured particulates from the first stage at a lower flowrate, but at high pressure using a high-pressure pump configured between the stages.

20 Claims, 3 Drawing Sheets

(51) Int. Cl.
  *G21C 19/307* (2006.01)
  *G21F 9/12* (2006.01)
(52) U.S. Cl.
  CPC .. *B01D 2321/04* (2013.01); *B01D 2321/2075* (2013.01)

(56) References Cited

U.S. PATENT DOCUMENTS

| | | |
|---|---|---|
| 8,052,879 B2 | 11/2011 | Gross et al. |
| 2002/0122525 A1 | 9/2002 | Rosenberger |
| 2002/0179545 A1 | 12/2002 | Rosenberger |

FOREIGN PATENT DOCUMENTS

| | | |
|---|---|---|
| WO | 2011/163030 A1 | 12/2011 |
| WO | 2018195265 A1 | 10/2018 |

OTHER PUBLICATIONS

Nuclear Fuel and its Fabrication (2016), https://www.world-nuclear.org/information-library/nuclear-fuel-cycle/conversion-enrichment-and-fabrication/fuel-fabrication.aspx, pp. 1-25.
Characteristics of Zeta Potential Distribution in Silica Particles, Blnst. for Eng and Env Research—Internet, pp. 1-3 (1996).
W. E. Berry et al., "Survey of Corrosion Product Generation, Transport, and Deposition in Light Water Nuclear Reactors", N P-522, Technical Planning Study 76-663, Final Report, Battelle, Columbus Laboratories (1979).
Busnaina, A. A., "Ultrasonic and Megasonic Particle Removal", Precision Cleaning '95, p. 347-360 (1995).
Callcut, V., "Aluminum-Bronzes—Part I, Metallurgy of Copper and Copper Alloys", pp. 1-37 (2002).
Collins S. R., "Low Temperature Surface Carburization of Stainless Steel", Swagelok via Internet, pp. 1-119 (2007).
Daniel R. C. "EFRT M-12 Issue Resolution: Comparison of Filter Performance at PEP and CUF Scale", USDOE, pp. 1-150 (2010).
Ambert et al., "Feasibility Assessment: Centrifugal Clarification for Control of Crystalline Silica in Spent Fuel Pools", Final Report, Nov. 2004.
Porous Metal Solutions, Mott Brochure, pp. 1-15 (2019).
Porous Metal Filter Elements, Mott Brochure, pp. 1-10 (2019).
Accusep™ Inorganic Membranes, Pall Brochure, pp. 1-10 (2002).
Understanding Particle Filtration in Liquids in Food and Beverage Industry Applications, Pall Brochure, pp. 1-18 (2016).
Unipleat® Plus, Unipleat® Plus, pp. 1-8 (2018).
Sinterflo® Sintered Metal Filter Cartridges and Elements, Provair Brochure, pp. 1-8 (2018).
Szkodo, M., "Estimation of Cavitation Erosion Resistance of Materials", Gdansk University (2015).
Thiruvengadam, A., "Mechanical Properties of Metals and Their Cavitation Damage Resistance", Hydronautics Corporation for ONR (1964).
Operating Instructions for Underwater Filtration Systems, Trinuclear Corporation (2018).
Filtration Systems, Trinuclear Corporation (2019).
Ullmann's Encyclopedia of Industrial Chemistry, Gosele, W. and Alt, C. "Filtration, 1. Fundamentals" (2000), Wiley-VCH Verlag GmbH & Co.
Varrin, R., Jr. "Characterization of PWR Steam Generator Deposits" EPRI TR-106048, (Feb. 1996).

METHOD AND APPARATUS FOR IMPROVED REMOVAL AND RETENTION OF RADIOACTIVE PARTICULATES FROM FLUIDS

FIELD

The present application relates to a method and apparatus for improved separation and containment of radioactive particulates from liquids by filtration.

BACKGROUND

It is commonplace to remove particulate materials found in aqueous liquids and solutions at industrial facilities such as electricity generating power plants including fossil power plants, geothermal power plants, or nuclear power plants. Other nuclear facilities not used for generation of electricity also have needs for removing particulates from fluids and systems as part of normal operations or waste treatment operations. Overall, removing particulates may be required to achieve a targeted fluid purity or clarity, to collect the particulates (e.g., for disposal or facilitate further treatment of the particulates), reduce the radioactivity of the fluid-particulate mixture, or to permit re-use or further treatment of the fluid. Particulates may also need to be removed to prevent damage to or interfere with the function or operation of equipment through which the fluids pass. It is often necessary or desirable to remove radioactive or chemically hazardous materials found in aqueous solutions at nuclear facilities to permit disposal of such fluids as waste in accordance with local, state or government regulations.

Particulates in electricity producing nuclear power plant aqueous fluids, include, but are not limited to particles in make-up water supplies and tanks, condensate storage tanks, liquid waste tanks, cooling water systems, spent fuel pools, and reactor cavities or pools. Particles may be in suspension or have settled to the bottom of equipment, vessels, and tanks. Particles exhibit a range of compositions and sizes and may or may not be radioactive. Particle compositions include metals, mineral species, metal oxides, silica species, detritus (e.g. waste, debris, dirt, dust), and "foreign objects" (e.g. grinding medium), by products from underwater cutting with plasma and thermal torches or by mechanical machining operations such as sawing, or wear generated particles from equipment. Particle compositions may also include corrosion products or metals, including metallic oxides, that result from corrosion, erosion, or degradation of plant equipment or material that has accumulated on nuclear fuel or primary system component surfaces at nuclear power plants. Sizes of particulates at nuclear facilities range from submicron to 100 microns or larger. In some cases, the fluid contains mixtures of particulates with varying size, chemical composition, or radioactivity. The volumes of fluids to be filtered can range from 1000's of gallons to more than 1 million gallons.

Particulates may also be liberated into fluids and systems as a result of cleaning or decontamination of equipment or components. Particulates and amorphous colloidal species (particulate species with small physical dimensions such that they can remain suspended in the aqueous fluid rather than settle by gravitational forces) may also be generated due to degradation of plant components.

Particulates in other nuclear facility aqueous fluids to be removed or separated include but are not limited to particles in wastes generated during the production of nuclear materials for nuclear weapons or during reprocessing or recycling of spent nuclear fuel for reuse as nuclear fuel.

Further, nuclear facilities that have experienced off-normal events that interrupt or compromise operations of the facility, such as equipment failures or accidents, may require removal of radioactive particulates from aqueous fluids generated by the off normal event or those generated to restore operations or cleanup up the site. An example is the cleanup after the 2011 accident at the Fukushima Daiichi plant in Japan, where the cost of cleanup and remediation of the site has and will be extremely high.

In instances where the particulates are radioactive, the removal from fluids and collection of these particulates imposes special handling precautions to minimize personnel radiation exposure or contamination of plant systems, components, or personnel. In addition, there is a potential that once collected or concentrated, these particulates emit enough radiation to result in degradation of the equipment used for removal or retention of the material, such as filtration medium. Disposal costs of such particulates once collected can be very high (e.g., disposal of a shielded waste container containing 1 $m^3$ of solid radioactive waste that is known as "Class C" was about $400,000 in 2018—this volume is comparable to what would be required to dispose of about 10 commercially available filters—based on filter sizes in, for example, the referenced Trinuclear, 2018 and Trinuclear 2019 publications). In addition, longevity of the equipment used for filtration to remove particulates is important given the significant expenses involved in removing radioactive particulates. Longevity may be achieved by using system components that are fabricated with materials with robust structural integrity, resistance to various forms of erosion or corrosion, or tolerance to radiation.

Given the high cost and challenges of removing radioactive particulates from aqueous fluids at electricity generating nuclear facilities and non-electricity generating nuclear facilities, longevity and optimized equipment utilization can be achieved by re-use of the systems used for particulate removal and reducing or reducing or minimizing the size of the container, vessel or filter in which the particulates have been captured for disposal or further treatment. Minimizing or reducing the size of the container, vessel or filter specifically reduces disposal costs as most nuclear waste repositories base disposal costs based on volume. Further, shipping costs associated with nuclear wastes are reduced with reduced volumes, and smaller volumes of wastes are generally more compatible with approved shielded shipping containers known as casks.

In the case of filtration, longevity and optimization of the particulate removal process can be achieved by regenerating or reusing the filters by a process known as backwashing. An example of ultrasonic backwashing of a filter for a nuclear application is disclosed in Gross U.S. Pat. No. 8,052,879 (incorporated by reference herein). Gross U.S. Pat. No. 8,052,879 is intended to be used primarily for filtration of particulates including those generated during commercial (i.e., nonmilitary) nuclear fuel cleaning (see Frattini U.S. Pat. No. 6,396,892, incorporated by reference herein)—other potential applications of the device are described. Gross U.S. Pat. No. 8,052,879 describes a single filter of an unspecified medium with "zones" that are fluidically connected and hence exposed to the same fluid pressure during normal operation. In a separate operation the filter is regenerated to itself. More specifically, one lengthwise region is regenerated, and a second lengthwise region loaded with particulates to a higher degree than the first region during backwashing by directing flow to this region by valves.

Cleaning is achieved by ultrasonic energy cleaning to enhance backwashing to an isolable lengthwise section of the filter which is claimed to increase loading of the overall system by about two-fold. Pressure limits are described as 35 psig (2.41 Bar) for a single filter medium (C6, L30). Gross U.S. Pat. No. 8,052,879 further describes a (1) filter system consisting of one assembly (C7, L7-8), (2) a means for achieving differential flow through the single assemble housing (112) with one "stage" of filtration, (3) structures for accommodating differential pressure both in normal flow and reverse regeneration flow below that used for normal filtration, (4) a means for isolating and draining the single filter of Gross U.S. Pat. No. 8,052,879. Optionally an embodiment in Gross U.S. Pat. No. 8,052,879 is to use separate filter housings connected by valve assemblies (C6, L2), but nowhere does Gross U.S. Pat. No. 8,052,879 teach the method or apparatus of a multistage filter apparatus described herein where (1) at least one first stage of filtration that (a) incorporates a filter medium (also referred to as media herein if more than one type of medium is used) that captures a desired percentage of particulates in a fluid (e.g., 90 to >99% capture) by exhibiting a pore size that is less than that of those particulates targeted for capture (b) permits a desirably high throughput by exhibiting a high flowrate capacity (e.g. 75 to 1000 gpm (17 $m^3$/hr to 230 $m^3$/hr)) thereby allowing large volumes of fluid to be filtered intermittently or continuously over times that may range from a few hours to 1 day to 1 year or more years depending upon the volume of fluid to be filtered and the concentration of particulates (c) achieves high throughput/flowrate with reasonably sized commercially available pumps (e.g. a pump requiring 5 to 50 HP (3.7 kW to 37 KW) at the above exemplary flowrates based on fluid having the viscosity of water at room temperature) (d) uses a filter medium or filter media that allows for high filter flux (e.g., 10 to 20 gpm of fluid/$ft^2$ of medium (25 $m^3$/hr/$m^2$ of medium to 50 $m^3$/hr of fluid/$m^2$ of medium) in an initial clean state such as 15 $ft^2$ (1.4 $m^2$) of a 5 micron medium rated at 10 gpm/$ft^2$ (25 $m^3$/hr/$m^2$) to achieve 150 gpm (34 $m^3$/hr) for a fluid with a viscosity similar to that of water-see for example Table 1.10 of Purchas, 2002 regarding the permeability of media that permit such fluxes) (e) structurally accommodates an initial differential pressure (DP) on the order of 1 psid (0.7 bar) (clean condition) and increasing differential pressure through the filter (DP in psid) as particulates are captured by interception (depth filtration) or caking up to the pressure rating of the filter (e.g., pressure rating in the range of 10 to 150 psid or 0.7 to 10.3 bar) with no decrease in target flowrate (f) typically but necessarily is configured with flow "inside to outside" in the case of a cylindrically oriented filter used for nuclear applications so as to capture the radioactive particulates within the inside of the first stage filter to improve retention of particles and therefore handling the filter for eventual disposal if the first stage filter itself becomes a disposal container for captured or residual radioactive particulates, and (g) is able to be backwashed intermittently in a short period of time (e.g., 1 to 60 minutes or a small percentage of the anticipated time the overall apparatus is in use) in the reverse flow direction ("outside to inside") without compromising the structural integrity of the filter or filter medium due to excessive backwash DP which could lead to collapse of the filter, wherein the reverse flow DP is typically even more restrictive than the allowable DP in the inside to outside flow direction, and (2) at least one independent or separate second stage of filtration downstream of the first stage that (a) receives either particulate laden fluid or backwashed particulate laden fluid from the first stage using a pump (b) incorporates a filter medium or media that captures a desired percentage of particulates in a fluid (e.g., 90 to >99% capture) by exhibiting a pore size that less than that of the size of the particulates targeted for capture which may be less than the size of the particulates captured by the first stage due to disruption or fragmentation of the particulates during to the backwashing process (c) permits a throughput or rate of fluid filtration at a flowrate that allows for collection of particulates released from the first stage by backwashing such that at least one volume of fluid equivalent to the volume of fluid in the first stage is filtered in the second stage during the backwashing process (e.g., less than 1 to 10 gpm (~0.23 to 2.3 $m^3$/hr), or for example 5 gallons per minute (1.15 $m^3$/hr) for a first stage filter with a volume of 15 gallons (0.06 $m^3$) backwashed in 3 minutes (d) achieves the required flowrate by using a pump between the stages that can supply fluid at higher pressure relative to that used to supply the first stage (150 to 3000 psi or about 10 to 200 bar) but requires similar energy requirements as that required by the pump supplying the first stage at lower pressure (e.g. 1 to 50 HP (~0.75 to 37 kw) at the above exemplary flowrates and pressures based on fluid having the viscosity of water at room temperature) (e) incorporate a filter medium or filter media that allows for adequate filter flux (e.g., 0.1 to 20 gpm of fluid/$ft^2$ (0.25 to 50 $m^3$ of fluid/hr/$m^2$) of 2 micron rated medium in clean state for a fluid with a viscosity similar to that of water) and can maintains adequate filter flux as the filter is loaded to a greater extent (f) structurally accommodates an initial differential pressure (DP) on the order of 1 psid (0.07 bar) (clean condition) and then increasing differential pressure through the filter (DP in psid) as backwashed particulates are captured up to the pressure rating of the filter (e.g., pressure rating in the range of 10 to 3000 psid or 0.7 to 206 bar differential or bard) with no decrease in target flowrate through use of media, media supports and filtration components (e.g. a housing or housings) with greater structural integrity relative to the first stage or stages and (g) typically but necessarily be configured with flow "inside to outside" in the case of a cylindrically oriented filter with one filter or multiple filter tubes, in the form of a tube bundle or other geometries as described later in this specification for nuclear applications so as to capture the radioactive particulates within the inside of the second stage filter to improve retention of particles and therefore handling the filter for eventual disposal if the second stage filter itself becomes a disposal container for captured or residual radioactive particulates. The use of a filter medium and filter system in the second stage that can accommodate high differential pressure relative to the first stage allows for a greater mass of particulates to be collected per unit surface area (for example as measured in grams particulate per square foot) as compared to the first stage or stages, and greater mass of particulates per unit filter volume as further described in this specification.

As described above, the first stage and second stage or stages being connected using a device for pumping the backwashed fluid and particulates from the first stage to second stage or stages, said pumping substantially increasing the pressure of fluid directed from the first stage into the second stage or stages (e.g., the pump described herein producing pressures in excess of 150 psig (10.3 bar), and likely in excess of 1000 psig (68.9 bar) and potentially up to 3000 psig (206 bar) or more). The zones in Gross U.S. Pat. No. 8,052,879 are always fluidically connected and nominally at one (ostensible low) pressure for example <150 psig (<10.3 bar) as further explained later in this specification.

Nor does Gross U.S. Pat. No. 8,052,879 teach the use of a pump between a first and second stage or stages to reduce the pressure in the first stage or stages to enhance the effectiveness of the backwashing using ultrasonic energy as further described later herein. Further, nowhere does Gross U.S. Pat. No. 8,052,879 teach the method of delivering the ultrasonic energy directly to the very interior of the first stage of filtration which eliminates the absorption losses through the filter housing or the filter medium itself or allow for cleaning by "acoustic streaming". Nowhere does Gross U.S. Pat. No. 8,052,879 describe use of cavitation erosion resistant media so that higher ultrasonic energy densities can be applied to enhance regeneration, or that alternate or thinner filtration medium may be used if it is cavitation-erosion resistant so as to further decrease filter DP and allow for even greater flowrates and loading. For the purposes herein, the first stage is referred to as the "high flow, low DP stage". The second stage is sometimes referred to as the "low flow, high DP stage" or similar terms. For brevity, the term first or second stage in the singular is used herein rather than first or second stages as it will become clear that either the first or second stage may involve use of filter stages in series or parallel.

For the purposes of this application, the "high" flowrates and allowable DPs of the first stage or stages are illustrative or exemplary of existing single stage filtration systems used in nuclear applications. The "low" flowrates and high DPs herein are exemplary of filtration systems used in other industries such as the plastic industry but not typically applied in the nuclear industry for continuous use owing to their relatively low throughputs. For reasons described herein, the method and process described herein overcomes this limitation or shortcoming.

Finally, some filtration applications in non-power generating nuclear operations operate at substantially lower flowrates and the high and low flow ranges may be lower (e.g. 5 to 10 gpm (1.15 to 2.3 m$^3$/hr) for high flowrate and less than 5 gpm (1.15 m$^3$/hr) for low flowrate) but the basic features of the apparatus and the process can be adapted for lower throughput systems as well.

WO2008151090A1 discloses an apparatus and method for increasing filter capacity using ultrasonic regeneration.

US2002122525A1 discloses a removal and collection of particulate from water filled tanks.

US2002179545A1 discloses a fluid conveyed material collection system. The following documents are cited in the specification.

Anonymous, "Nuclear Fuel and its Fabrication" (2016) World Nuclear Association, obtained from the internet at: www.world-nuclear.org/information-library/nuclear-fuel-cycle/conversion-enrichment-and-fabrication/fuel-fabrication.aspx, pages 1-25.

Anonymous, "Classifications of Nuclear Waste, What's high? What's low? How are classifications decided?" (1996) Institute for Energy and Environmental Research, obtained from the internet at: ieer.org/resource/classroom/classifications-nuclear-waste/, pages 1-3.

Aperador, W. et al., "Diagnostic of the Erosion Corrosion Evolution by Cavitation of [TiN-TiA IN]$_{200}$ Thin Coatings", Int, J. Electrochem, Sci., (2014) pages 3876-3844.

Berry, W. E., et al., "Survey of Corrosion Product Generation, Transport, and Deposition in Light Water Nuclear Reactors", Abstract only, EPRI NP-522, (1979).

Busnaina, A. A., et al., "Ultrasonic and Megasonic Particle Removal", Precision Cleaning '95 Proceedings (1995) pages 347-360.

Callcut, V., "Aluminum Bronzes-Part I, Metallurgy of Copper & Copper (2002) pages 1-37, obtained from the internet at Alloys" www.copper.org/publications/newsletters/innovations/2002/08/aluminum1.html.

Collins, S. R., et al., "Low Temperature Surface Carburization of Stainless Steels", Final Technical Report, Sawgelok Company (2007) pages 1-119.

Daniel, R. C., et al., "EFRT M-12 Issue Resolution: Comparison of Filter Performance at PEP and CUF Scale" (2010) WTP-RPT-185, Rev 1, U.S. Department of Energy, pages 1-150.

Frattini, P. L. et al., U.S. Pat. No. 6,396,892 (May 28, 2002).

Gross, D. J., et al., U.S. Pat. No. 8,052,879 (Nov. 8, 2011).

Lambert, R., et al., "Feasibility Assessment: Centrifugal Clarification for Control of Crystalline Silica in Spent Fuel Pools", EPRI TR-1009697 (2004) pages 1-66.

Mott Corporation Porous Metal Products Brochure, "Porous Metal Solutions" (obtained 2019) pages 1-15.

Mott Corporation Process Systems Brochure, "Porous metal filter elements" (obtained 2019) pages 1-11.

Pall Corporation Brochure, "AccuSep™ Inorganic Membranes" (2002) pages 1-10.

Pall Food and Beverage, "Understanding Particle Filtration in Liquids in Food and Beverage Industry Applications" (2016) pages 1-8.

Pall Corporation Data Sheet FCUPPMFFEN, "Unipleat® Plus" (2018) pages 1-2.

Porvair Filtration Group Brochure, "SinterfloR Sintered Metal Filter Cartridges and Elements" (2018) pages 1-8.

Purchas, D. B and K. Sutherland, "Handbook of Filter Media", 2$^{nd}$ Addition, Elsevier Science Ltd., Oxford, U K 2002.

Szkodo, M, "Estimation of Cavitation Erosion Resistance of Materials", Gdansk University of Technology (2015) pages 1-6.

Thiruvengadam, A., et al., "Mechanical Properties of Metals and Their Cavitation Damage Resistance", Hydronuatics Corporation, TECHNICAL REPORT 233-5, prepared for Office of Naval Research (June 1964) pages 1-47.

Trinuclear Corporation Brochure, "Operating Instructions for Underwater Filtration Systems" (2018) page 1.

Trinuclear Corporation "Filtration Systems" (2019) pages 1-2, obtained on the internet at trinuclear.com/filtration-systems.

Ullmann's Encyclopedia of Industrial Chemistry, "Filtration, 1. Fundamentals" (2000).

Uppili, S., WO 2011/163030 A1 "Method for Cleaning Porous Metallic Filters Using A Steam-Ultrasound Technique" 29 Dec. 2011.

Varrin, R., Jr. "Characterization of PWR Steam Generator Deposits", Abstract only, EPRI TR-106048, (1996).

SUMMARY

A method and apparatus for improved separation and containment of radioactive particulates from liquids by filtration is described. A benefit of this invention is higher overall particulate loading of the filter, particularly a filter to be disposed of, for a given filter volume, with the filter and its housing and appurtenances preferable exhibiting a function, form, shape and size that is suitable for retention of the particulates consistent with the requirements for long term storage and/or disposal of the filter containing the particulates as radioactive waste. Additional benefits include features designed to improve system integrity and hence useful life of the apparatus. Higher filter loading and enhanced reliability reduce the overall cost of filtration and waste disposal.

Various embodiments relate to the cleaning, treatment, and purification of aqueous fluids at nuclear facilities. Embodiments also include removal, concentration and retention of solid particulates present aqueous fluids and systems at nuclear facilities.

The improvements are achieved by utilizing more than one stage of filtration to remove radioactive particulates from a fluid. The first stage or stages of filtration is/are designed for high liquid flowrate, low differential pressure across the filter medium, and reversibility of flow through the filter medium to facilitate backwashing. High flowrate in normal filtration mode permits large volumes of fluid to be treated in a reasonable time. Flow is achieved by pumping liquid containing radioactive particulates into the filter, or pulling liquid through the filter, using a high capacity pump that does not over pressurize the filter or increase filter DP so high as to compromise the integrity of the filter. The flowrates that constitute "high capacity" are describe later in this specification. The overall system can be configured to permit reverse flow through the first stage filter for backwashing in various ways. Low differential pressure is typically required in backwashing mode to prevent damage to or collapse of the filter or filter medium especially when the reverse flow direction is from outside to inside in the case of a cylindrical filter. Backwashing can be achieved by reversing the flow alone or assisted by ultrasonic energy. The second or more stages of filtration receive the backwash flow and capture particulates from the first stage at a lower flowrate, but at high pressure using a pump, most preferably a high-pressure pump, configured between the stages. The second stage of filtration is not designed to necessarily be able to be backwashed but rather is designed to be compatible with significantly higher pressure in the normal flow direction (typically inside to outside but also outside to inside if the filter housing retains any spalled or non-adherent particulates and can structurally accommodate the pressure of the fluid). The ability to withstand significantly higher pressure increases the loading capacity per unit surface area of this second stage filter as compared to the first stage filter even as depth filtration occurs and then filter cake accumulates.

A radiation resistant filter medium suitable for especially the second stage but also the first stage of filtration would include ceramics, membranes, sintered metal powders, or sintered metal fibers. The apparatus described herein may incorporate a filter medium in the first stage which is resistant to cavitation erosion of the filter medium or media that can occur during ultrasonically-assisted backwashing. Ultrasonic energy for backwashing may be applied from outside the filter or internal to the filter, either between the housing and the filter or from the inside of the filter itself. Supplying ultrasonic energy from outside the filter can be achieved with an ultrasound generating devices such as an ultrasonic transducer placed adjacent to the filter housing if the apparatus is submerged underwater, or by directly attaching or contacting the ultrasonic device to the filter housing.

Liquids containing radioactive species and particulates or other particulates or species that are candidates for improved filtration include liquids at commercial nuclear power plants, liquid wastes generated during cleaning or decommissioning of nuclear power plants including fuel, liquids at plants that have experienced radiological events or accidents, and liquid wastes stored (for example in underground tanks) and treated at nuclear reactor sites operated for non-electric power production purposes including nuclear weapons production.

In one embodiment of the invention, an apparatus for filtering particulate materials found in aqueous liquids or solutions comprises:
  a. a first filter designed for high flowrate and low differential pressure (DP);
  b. a second filter designed for high DP but low flowrate;
  c. a pumping system to move the liquids or solutions through and between the first and second filters; and
  d. a periodic regeneration system that regenerates the first filter and pumps the resulting particle laden effluent through the second filter.

The filter apparatus may be further equipped with at least one of pressure transducers; gauges or transmitters; flow meters or flow totalizers; radiation monitors to assess filter loading or backwashing efficiency; and operators and controllers for pumps and valves.

The filter apparatus may comprise a periodic regeneration system that reduces pressure in the first filter caused by the pumping system with a valve that throttles flow into the filter.

In the filter apparatus, the periodic regeneration system may comprise devices to reverse the flow through the filter and/or ultrasonic energy producing transducers.

In the filter apparatus, the frequency of the ultrasonic energy may be in the range of 20 kHz to 1.0 MHz.

In the filter apparatus, the frequency of the ultrasonic energy may be in the range of 20 to 40 kHz.

In the filter apparatus, the first filter may comprise filter medium or media that is/are resistant to corrosion and cavitation erosion induced by ultrasonic energy.

In the filter apparatus, the first filter medium may exhibit a thickness in the range of less than 0.02 to 0.065 inches (0.5 to 1.65 mm) with supporting medium or backing material.

In the filter apparatus, the first filter medium may exhibit a flux of 1 to 10 gpm/ft$^2$/psid (36 to 356 m$^3$/hr/m$^2$/bard) in clean condition.

In the filter apparatus, the second filter medium may exhibit a thickness in the range of 0.06 inches (1.5 mm) to 0.15 inches (3.8 mm) or more.

In the filter apparatus, the first filter medium may exhibit a flux of 0.1 to 10 gpm/ft$^2$/psid (3.6 to 360 m$^3$/hr/m$^2$/bar differential) in clean condition.

In the filter apparatus, the first or second filter medium may incorporate provisions for accommodating high pressure and pressure differential such as being thicker, or supporting thinner medium with one or more layers of "backing material", or other structural support such as perforated metal sheets.

In the filter apparatus, the filter media in the first or second stage may comprise more than one layer of filter medium with the same or different pore size or pore size distribution.

In the filter apparatus, the first and/or second filters' dimensions may resemble those of a spent nuclear fuel assembly to accommodate storage and disposal in a system already available, i.e., previously in use, for a spent fuel assembly. In the filter apparatus, the second filter may be designed for flow in one direction, and may comprise structures compatible with high pressure operation, and the structures may be selected from thicker higher porosity media, screens, wires or wedge wires.

The first filter may comprise media of radiation resistance compatible with radiation fields of hundreds to thousands of rads per hour or more.

The second filter comprises medium of high radiation resistance compatible with radiation fields of hundreds of rads per hour but preferably thousands of rads per hour or more.

The particulate materials targeted for filtration may be selected from non-crystalline, crystalline, or amorphous materials.

The first filter may comprise pore sizes ranging from 0.1 to 100 microns.

The first filter may comprise pore sizes ranging from 0.2 to 5 microns.

The first filter may comprise pore sizes ranging from 1 to 5 microns.

The second filter may comprise pore sizes ranging from 0.1 to 100 microns.

The second filter may comprise pore sizes ranging from 0.1 to 1 micron.

A method for filtering radioactive particulate materials found in aqueous liquids or solutions may comprise:
 a) pumping the aqueous liquid or solutions through a first filter designed for high flow and low differential pressure (DP);
 b) pumping the aqueous liquid or solutions through a second filter designed for high DP but low flowrate; and
 c) regenerating the first filter and pumping the resulting particle laden effluent through the second filter.

During regeneration the pressure in the first filter caused by the pumping may be reduced with a valve that throttles flow into the first filter.

The regeneration is accomplished by reversing the flow, and/or applying ultrasonic energy producing transducers.

The frequency of the ultrasonic energy may be in the range of 20 kHz to 1.0 MHz.

The frequency of the ultrasonic energy may be in the range of 20 to 40 kHz.

The first filter may comprise filter media that is resistant to corrosion and cavitation erosion induced by ultrasonic energy.

The particulate materials targeted for filtration may be comprised of non-crystalline, crystalline, or amorphous materials or combinations of these materials.

The liquid to be filtered may also contain ionic non-particulate radioactive species.

The first filter may comprise pore sizes ranging from 0.1 to 100 microns.

The first filter may comprise pore sizes ranging from 0.2 to 5 microns.

The first filter may comprise pore sizes ranging from 1 to 5 microns.

The second filter may comprise pore sizes ranging from 0.1 to 100 microns.

The second filter may comprise pore sizes ranging from 0.1 to 1 micron.

The pressure limits in the normal direction of flow in the first filter may be limited to 0.7-10 bar (about 10 to 145 psid) DP.

The pressure limits in the second stage filter may be from 10 to 200 bar (145 psid to 3000 psid), preferably 20 to 200 bar (about 300 to 3000 psid) but most preferably 65 to 200 bar (about 870 psid to 3000 psid) DP.

DETAILED DESCRIPTION

Figure 1:
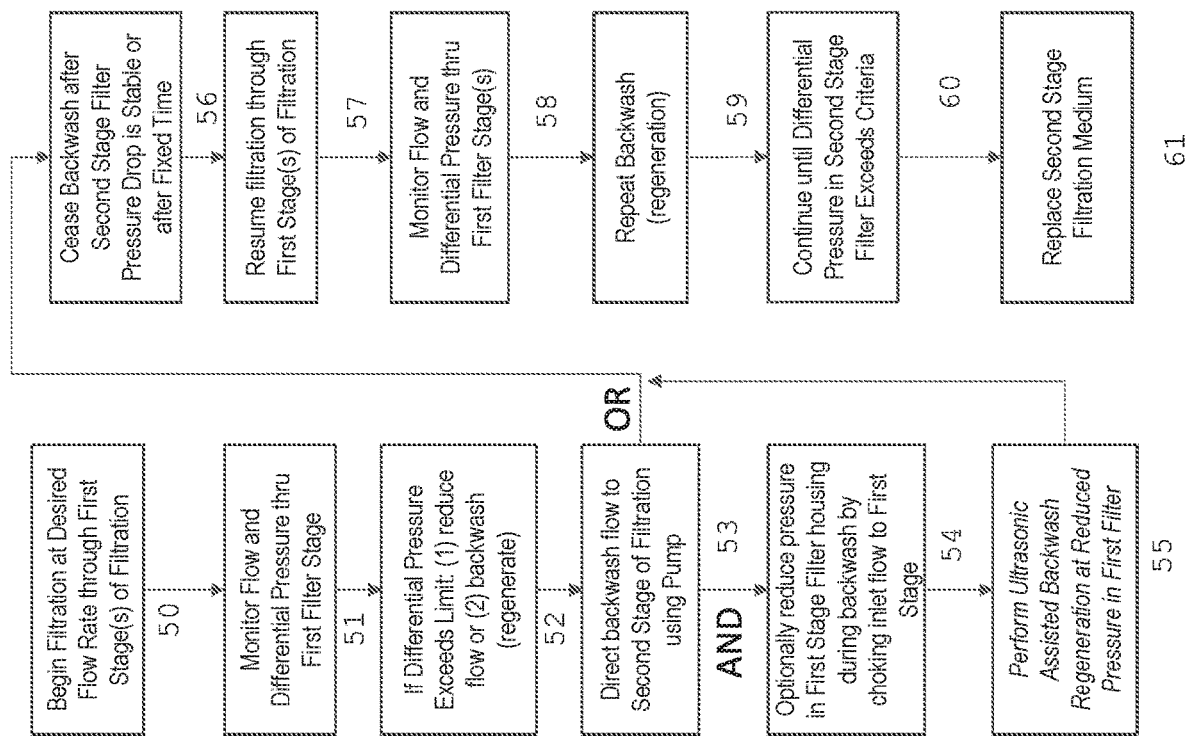
FIG. 1 illustrates the overall process of the improved method of removal and retention of radioactive particle materials.

A method and apparatus are provided for improved filtration of fluids containing particulates or amorphous/colloidal materials for the purpose of one or more of: improving the fluid purity, improving fluid clarity, retaining the particulates for disposal, reducing the fluid radioactivity, treating fluid that results from cleaning of systems or components, or modifying fluid chemistry. The method and apparatus are particularly suitable for the filtration of fluids containing radioactive particulates. The particulates removed are retained in a manner that allows for safe and economical disposal or storage of the particulates. Benefits of the disclosed subject matter include: (1) improved filtration process efficiency/throughput and reduction in number of filters consumed or required for a given fluid volume to be processed or particulate mass to be removed and retained, (2) reduced overall energy requirements, (3) potential to operate at a wide range of fluid flowrates, (4) reduction in size of the filters and filter housings required for retention of the particulates in a manner and form suitable for storage or disposal as radioactive waste in new or existing facilities, (5) more effective regeneration, cleaning or backwashing of the system by ultrasonic cleaning, back pulsing, or back pressure pulsing, and (6) improved integrity and longevity of filter media and filtration system components.

The improvements are achieved by using more than one stage of filtration, with each stage providing an independent function. The first stage or stages are designed for high flowrate allowing for filtration of large volumes of fluids in a reasonable amount of time. As noted earlier, the volumes of fluids requiring filtration at nuclear facilities can be large and hence high flowrate is desirable. High flowrate, high filtration "flux," is achieved using a high flowrate pump capable of 75 to 1000 gallons per minute (gpm) (17 to 230 $m^3$/hr) or more either discharging to the inlet of the filter or configured to take suction from the discharge side of the filter to pull liquid through the filter.

The filter medium of the first stage or stages exhibits high specific surface area to achieve low pressure drop. Example fluxes of such media are 1 to 10 gpm fluid/ft/psid (36 to 356 $m^3$/hr/$m^2$/bard) in clean state (see for example Purchas, 2002; Pall, 2002). One example is obtained by pleating a porous metal medium. Low pressure drop is further achieved by employing a filter medium with a pore size small enough to retain the vast majority of the mass of particulate, typically 90-99% of the particulates of interest, but not so small as to result in rapid fouling of the filter by clogging that compromises depth filtration behavior (retention of particulates with the medium or media) or excessive caking (formation of layers on the filtration medium or medium surfaces), either of which can result in cessation of flow or unacceptably high pressure through the filter itself. The pore size or filter "rating" may be larger than the smaller particulates in the fluid, but these small particulates may only represent a small percentage of the overall particulate mass. For example, for a particle size distribution of 0.5 to 5 microns (typical of some nuclear plant particles, see Berry, 1979), 0.5 micron particles exhibit only 0.1% of the mass of 5 micron particles. The smallest particles may also be captured as the filter begins to retain particulates and effectively "pre coats" the filter such that the pore size of the retained filter cake is smaller than the normal pore size of the medium, a common behavior of depth or surface filters. This is particularly relevant where the volume of fluid is recirculated many times through the first stage or stages of filtration such as during cleanup of pools of liquids where the fluid is drawn from and returned to an open source of fluid.

Low pressure drop reduces the energy required to pump large volumes of fluids containing particulates and reduces the structural integrity requirements for the first stage filter and filter medium that might be caused by high differential pressure at high nominal flowrates. A typical motor rating affixed to a 150 to 600 gpm (34 to 138 m$^3$/hr) pump used for such filtration is the range of 20-50 horsepower (HP) (15-37 KW) for a nominal 1 micron cartridge type cylindrical filter that is three feet high by six inches in diameter (see, for example, Trinuclear Corporation, 2019). The volume of the filter in this hypothetical example is about 0.6 cu. Ft. (about 5 gallons or 0.02 m$^3$).

The integrity of the media must be maintained to prevent fluid from bypassing the medium through damaged areas such as cuts, perforations, tears, or holes. The media used for filtration are often thin and non-structural (not self-supporting) porous synthetic, natural, or metallic sheet like materials (thickness typical of 0.02 to 0.06 inches (0.5 to 1.5 mm)) and not able to withstand high pressure forces in either the normal flow direction or under reverse flow, such as would be required for backwashing to be discussed below. Various layers of high porosity materials (perforated plates, wedge wire screens, barrier layers, etc.), helical steel wires, or forms are often used to sandwich and support the delicate filter media that permit high flowrates with targeted retention of particles in the range of 0.1 to perhaps 100 microns, but most commonly 0.5 to 5 microns (see, for example, manufacturers' datasheets and catalogs, such as Trinuclear, 2019, several citations). As described elsewhere, differential pressure limits in the normal direction of flow may be limited to 0.7 to 10 bar (about 10 to 145 psi) but may be lower in the reverse direction (less than 3 bar (43 psi)) (see, for example, Pall, 2016; Porvair, 2018; and Gross, U.S. Pat. No. 8,052,879). Clean pressure drop with no particulate loading may be about 1 bar (14.5 psi) (Purchas, 2002), hence the filter at high flow can be operated until the differential pressure increases about 3 to 10-fold. Other mechanisms by which the filter medium may be damaged is cavitation erosion caused by ultrasonic backwashing or damage caused by back-pulse type backwashing.

The first stage or stages of filtration is operated intermittently or continuously for hours, days, weeks, or months at high flowrate until the pressure in the filter approaches or exceeds a level that which might compromise the integrity of the filter (e.g. 0.7-10 bar or 10-145 psi). Alternatively, the integrity of the first stage or stages may be preserved by reducing flowrate to reduce pressure drop and demands on the filter, but at the undesirable expense of longer filtration process times. If the first stage or stages is not intended for long term storage containing radioactive particulates, it can be fabricated with a medium that is less radiation resistant including non-metallic materials such as nylon or cellulose. Hence the cost of first stage filters may be greatly reduced over a radiation resistant metal medium filter.

The second stage of filtration configured downstream of the first stage is designed to exhibit a high degree of structural integrity to accommodate high pressure drop relative to the first stage, but at the expense of sacrifices in allowable flowrate (lower filtration flux). It is operated for relatively short periods of time (e.g., minutes to hours during backwashing of the first stage as described later in this specification) in the normal direction only-generally from the inside to outside in the case of a cylindrical filter geometry but can be operated from outside to inside if the filter housing provides adequate structural integrity. The second stage of filtration is used to capture particulates released from the first stage during periodic first stage regeneration or backwashing. The second stage of filtration can also be used independently of the first stage if the high flowrate filtration capability of the first stage is not required. The particle size rating of the second stage can be smaller than the first stage thereby capturing finer particles liberated quickly from the first stage during once-through regeneration cycles, the small rating being acceptable given the higher-pressure capacity which counteracts issues with reduced flow (e.g. less than 1 micron for particles discussed in Berry, 1979). Finer particle retention is also advantageous as regeneration by ultrasonic backwashing can result in particle size reduction (attrition) due to disruptive cavitation implosion events at the particles during backwashing with ultrasonic energy.

The operation of the system summarized in FIG. 1 involves filtering fluid containing particulate materials through a first stage 50. Flow and differential pressure are monitored 51 until they reach a termination criterion: excessive differential pressure across the first stage filter, or cessation of flow in the normal direction through the first stage of filtration. If the differential pressure exceeds a limit, a flow is established and maintained in a reverse direction through the first stage to achieve regeneration or "backwashing" 52. This backwash flow is directed through a pump (preferably a high-pressure pump, capable of operating at above 150 psi (10 bar), preferably up to 2000 psi (138 bar) and most preferably up to 3000 psi (206 bar)) aligned to discharge to the second stage 53, or the backwashing cycle is ceased after the particulates previously captured in the first stage are captured in the second stage 56.

While the first stage of filtration is designed for operation at high flow and low differential pressure (using a relatively inexpensive and commercially available high flowrate pumping system with low energy demand such as those described in Trinuclear 2018 and 2019), the second stage is designed for low flow but high differential pressure (using a high head but low flowrate commercially available pump used in many industries such as the chemical and petrochemical industries). As described elsewhere, the second stage is used primarily during backwashing which requires a short period of time (typically minutes and generally only periodically required). More specifically, it is envisioned that the time required for backwashing is on the order of minutes so that the time that the first filter is offline for backwashing may only represent <1% of system operating time if backwashing is required one time per day. A pump used to transfer the fluid and backwashed particulates from the first stage filter is a high head pump capable of delivering fluid at 10 to 200 bars (145 to 3000 psi) at low flow (1-10 gpm (0.23-2.3 m$^3$/hr)). The motor required to drive such a high head, low flow pump is comparable to or less than that required to drive pump supporting the first stage, or about 20 HP (15 KW) or less. One ordinarily skilled in the art would recognize that the same motor could be used to drive the pumps that supplies the first stage or stages as well as the pump that supplies the second filter stage and that the first and second stage pump can be a single pump with a high turndown ratio.

Effectively, the second stage accumulates the particulates captured in the first stage over many cycles of regeneration/backwashing 57, 58, 59, 60 and is capable of high specific loading (e.g. in g/cm$^2$) and therefore captures a large amount of particulate in a small volume device (rather than many comparable sized or larger first stage filters). Specifically, after the end of the backwash 56, filtration is resumed through the first stage or stages of filtration 57. Flow and differential pressure are monitored through the first filter stage or stages 58. For regeneration purposes, backwash is repeated 59. Backwash continues until the differential pressure in the second stage filter exceeds a predetermined criterion 60. Such criteria can be: (1) the second filter 26 would be operated until the maximum allowable DP of the filter set forth by the filter manufacturer is reached, such as up to 1000 psid (69 bard) or up to 1850 to 3000 psid (127 to 206 bard); (2) alternatively, until some percentage of the maximum specified DP for the filter is obtained, say 80% as a margin of safety (80% of 3000 psid (206 bard) would be 2400 psid (165 bard), for example); or (3) until the activity of the accumulated radioactive material in the second filter 26 reaches some predefined limit in curies, for example, to keep it below a limit that would permit disposal in non-geologic repository—waste that is "Greater Than Class C" or GTCC is defined in 10 CFR Part 61. Although that limit depends on what nuclides are present, it is typically greater than 7 curies per cubic foot (see Anonymous, "Classification of Nuclear Waste . . . ", 1996). At that point, the second stage filter 61 is replaced.

The surface areas of the second filter stages can be targeted to be similar to the first stage, but it may not need to be, given its higher loading capacity (g/cm$^2$). Based on common methods for calculating loading of surface or depth type filters, the second stage loading is roughly proportional to filter cake thickness (neglecting the volume of the filter cake in cylindrical form whose mass would be inversely proportional to the square of the thickness). Hence, for a first stage operating at a termination criteria pressure of about possibly 3 bar (43 psid), a second stage operated at a differential pressure of 100 bar (1450 psid) would have about 30 times the loading capacity of the first stage for the same surface area. As such, a far fewer number of highly loaded and potentially highly radioactive filters would need to be stored or disposed of. A preferred embodiment is to construct the filter with materials including medium which is radiation tolerant (metal).

In another example, a 10 gallon (0.037 m$^3$) (volume) first stage filter operated at 150 gpm (34 m$^3$/hr) for an extended period (hours to years) that captures 750 grams of particulates on 15 ft$^2$ (1.4 m$^2$) of medium (50 grams particulates/ft$^2$ or 50 grams per 1.4 m$^2$) up to a limiting DP of say 50 psid (3.4 bard), can then be backwashed to and captured by the second stage filter using ½0th (i.e. 50/1000th) the amount of filter medium or 0.75 ft$^2$ (0.07 m$^2$) of medium if the limiting DP of the second stage medium is 1000 psid (69 bard). This is again in accordance with Darcy's Law which states that filter DP is generally proportional to loading for depth filtration and caking. The backwashing performed for a time no less than the time required to receive one volume of fluid from the first stage or 10 minutes at 1 gpm (0.23 m$^3$/hr), but can be longer if backwashing occurs over a longer time duration than the residence time (liquid volume inside the filter in the case of outside to inside flow path during backwashing divided by fluid flow rate) of the fluid in the first stage during backwashing. As described elsewhere, backwashing by ultrasonic energy may take longer than one residence time. In any case, the volume of the second stage filter can be reasonably assumed to be reduced in an amount similar to the reduction in medium area. In this example, the smaller second filter is replaced after one backwashing.

In a final example, if the surface area of the second stage medium is the same as or similar to the first stage, the second stage could be used for 20 backwash cycles and therefore hold 20 times as much particulate as the first stage. One can further appreciate that the surface area of the second stage could be larger and therefore hold even more than 20 times the amount of particulate at the first stage in this example.

One can appreciate that it would be less advantageous to design and operate the second stage as the primary filtration with high flowrate and ability to withstand high pressure drops. A 500 gpm (115 m$^3$/hr) filter capable of greater than 100 bar pressure differential (1450 psi pressure differential) would require a very large motor for continuous operation, in excess of 500 HP (374 KW).

In one embodiment, in addition to directing the backwash flow to the second stage of filtration using a pump 53, the pump used to transfer fluid from the first stage to the second stage of filtration can be operated in a manner such that it reduces the pressure within the first stage of filtration thereby improving the ultrasonic cleaning action by allowing for easier cavitation of the fluid 54. Backwashing of the first stage is achieved with pressure pulsing (back pulsing) or with ultrasonic energy 55 (which disrupts, dislodges and flushes the particulates from the medium by cavitation or acoustic streaming). Thereafter, steps 56-61 are carried out as described above. This is particularly relevant when the overall filtration system is submerged in, for example, a pool of water and the filter system is under pressure due to hydrostatic head.

For both the first and second stage, one embodiment is to design the filters such that their dimensions resemble those of a spent nuclear fuel assembly to accommodate storage and disposal in system already available for spent fuel assembles (such a spent fuel pool racks or dry cask storage facilities). A typical 17×17 Pressurized water reactor (PWR) fuel rod assembly is 9 inches (22.9 cm) on a side, 8 to 14 feet long (2.4 to 4.3 m), while a typical 9×9 Boiling water reactor (BWR) fuel rod assembly is 6 inches (15 cm) or so on a side (pins is a box tube "channel") and typically 12 feet (3.7 m) long. PWR fuel rods are exposed in the assembly and not "channeled". In both PWR and BWR cases, the configuration of the topmost "nozzles/lifting handles" and lower end "nozzle" geometry of the fuel rod assembly would be replicated in the filter to allow it to mate with existing vessels, containers or racks designed to lift, move, position, and store spent nuclear fuel assemblies (Nuclear Fuel and its Fabrication, 1996). The filters in the first and second stage may consist of segments of filters which are stacked.

Finally, when ultrasonic energy is used to enhance backwashing, it is important to maintain the integrity of the filter medium in the first stage by rendering it less susceptible to cavitation erosion which could result in loss of filter function if a defect becomes "through wall". To achieve this goal, the filter medium may be selected to be cavitation erosion resistant. This can be achieved by material selection or coating of the filter medium with a cavitation erosion resistant material layer.

In the context of this invention, filtration includes the processes of: (1) transferring, passing or pumping fluid through a porous medium in the form of a depth filter, examples of which would be cartridge filters, disc filters, leaf disc filter, a filter press, or a dead end filter such as a candle filter with one element or multiple filter elements configured in parallel, or through a cross flow filter to sequester or retain particulates, (2) removal/replacement of the filter medium/element after the process is complete or filter loading capacity has been met, and (3) optionally employing devices or methods for periodic regeneration of the filter so that it does not need to be removed or replaced. The pore size, pore size distribution, thickness, and other aspects of the filter medium such as structural integrity or chemical or environmental (temperature, pressure) compatibility with the fluid stream are chosen to reliably sequester, hold and retain particulates. Filtration may be ceased if the need for filtration disappears (fluid is clean), other filtration goals have been met (solids concentration goals achieved, for example, in cross flow filtration), or the filtration process is terminated due to excessive filter loading, excessive radioactivity level on the filter (in the case of filtering radioactive particles), or there is reduced filtration throughput, reduced efficiency, or excessive pumping power required due to fouling. In the context of this document, the term filter is meant to include the filter housing, filter hosing and appurtenances such as fluid connections, access for instrumentation, and access for regeneration devices such as by ultrasonic energy cleaning or pressure pulsing.

Typically, the filter medium used depends on the user's specific goals and objectives. Filter medium can include natural material (cellulose or cotton), polymers (urethanes, nylons, plastics, olefins), ceramics, or metals and metal alloys. Magnets may also be used for filtration if the particulates exhibit enough magnetic susceptibility.

Filtration may also be used to remove soluble species and contaminants if the filtration medium is configured to do so and contains in total or in part medium that absorb, adsorb, or otherwise sequester the soluble species. Medium amenable to sequestration or removal of soluble species includes organic ion exchange medium, inorganic ion exchange medium, or electrochemical devices.

The physical and chemical mechanisms involved in filtration are well documented in the literature and not repeated here (see, for example, Ullmann's, 2000).

An exemplary embodiment is the filtration of particulates from liquids at nuclear power plants or other nuclear facilities which may or may not be radioactive. As described later, the particulates at such facilities are often highly radioactive or toxic and the cost of disposal of filters used to capture these particulates can be very high.

Example sources of particulates at nuclear facilities, the mechanism of filtration, mechanisms for optimizing filtration system, and a description of the various features of this invention are described below.

Particulates—While there are many aqueous fluids in nuclear facilities that contain particulates and many particulate types, the following six types are noted herein as examples.

A. CRUD—Corrosion products in pressurized water reactor (PWR) and boiling water reactor (BWR) fluid medium include CRUD (CANDU Reactor Unidentified Deposit) formed in primary (nuclear side) of the plants as well as corrosion products on the secondary or non-radioactive side of PWRs (see, for example, Berry et al., 1979 and Varrin, 1996). CRUD may contain metallic species (iron, nickel or cobalt particles), corrosion products or oxides of metals such as iron, nickel or cobalt. Particles sizes as characterized by mean diameter can be from <0.1 micron to 100 microns or more. When present on the primary side of the power plant, they may become radioactive or activated during plant operations. Their radioactivity is in many cases so high that exposure to CRUD or removal from primary coolant, or other aqueous systems at plants, is hazardous and costly.

B. Accumulation of CRUD on fuel surfaces of some plant equipment is also undesirable. In the case of CRUD on fuel surfaces, it can lead to "under deposit corrosion" of the fuel surfaces or a phenomenon known as crud induced power shift (CIPS). This CRUD can be removed from fuel surfaces (see for example, Frattini '892), but disposal of any on filtration or other medium upon which CRUD has been collected is expensive and can result in undesirable exposure of personnel to radiation.

C. Silicates—Other contaminants present in nuclear plant water include silica species. These may be naturally present in make-up water supplies (all fossil and nuclear plants must have a source of "make-up" water to replace water lost due to evaporation, plant operations or sampling), or from specific sources such as degradation of fuel storage racks that contains contain silicon compounds in neutron absorbing medium. This degradation, results from a combination of reaction of the silicon compounds with water and exposure to radiation fields. While they may not be in themselves radioactive, the fluids in which they exist typically contain other particulates that are radioactive. Suspension of particulate silica species in spent fuel pool water can lead to severe turbidity problems. Hence their removal is desirable. Silica particle sizes can range from <0.001 micron to >100 microns, with typical colloidal particles in the range of 0.1 to 1 micron (se Lambert, 2004). Particulates resulting from degradation of spent fuel pool storage racks may be amorphous or crystalline (Lambert, 2004).

D. Particulates Associated with Waste Treatment at Nuclear Material Production Facilities—The treatment of wastes generated during the production of fissile materials, particularly those at government owned and operated sites, is challenging. The filtration and collection of particulate waste species is often desirable including aluminum species like gibbsite or boehmite and other oxides.

E. Settled Sludge—Particulate material that has settled to the bottom of tanks and vessels at nuclear power plants can be removed by vacuuming, a process that mixes the particulates with a fluid to produce a sludge. The species in the sludge may include corrosion products, debris, and detritus. The particulates are often amenable to capture by vacuuming devices where the vacuumed material is directed to a filter system (see Trinuclear Corporation, 2019).

F. Cutting, Grinding or Machining Debris and Particulates—The maintenance, repair or decommissioning of nuclear facilities often includes underwater cutting, grinding or machining operations. These processes produce particulates or kerf that can result in the spread of radioactive contamination within a fluid or above the surface of an aqueous fluid reservoir. These materials also can reduce water clarity which may hinder the cutting, grinding or machining operation. The removal of such particulates by filtration is often necessary.

G. Liquid Wastes at Plants that Experience Accidents—The collection and storage of liquids wastes at nuclear sites and plants that have experienced radiological or other accidents is critical to the remediation of the plant site and to protect workers and the public. The treatment of such wastes often include filtration to remove radioactive or non-radioactive particulate species to isolate them for processing or permit downstream processing or release of the fluids after removal of the particulates.

One ordinarily skilled in the art would recognize that there is a wide range of particulate material in nuclear fluid systems in terms of chemical composition, size, physical properties.

It is often desirable to remove collected particulates and to re-use the filter used for first stage or stages of filtration. Release of particles to regenerate or clean the filter, such as by backwashing, is achieved by imparting form drag, shear forces, or other forces on the entrapped particles sufficient to overcome attachment to the filter surface s within the medium itself, or interparticle attraction between materials collected at the surface of the filter. Regeneration, such as through backwashing, also disrupts and dislodges layers of particulates that have formed on the filter medium (filter cake). Backwashing can be achieved by reversing flow direction at high or low flowrates (with consequent higher or lower pressure differential through the medium), by other mechanical methods or devices (pressure pulses, ultrasonic cleaning, vibration, acoustic cleaning), or a combination of methods. In one instance reservoir 24, valve 25, and conduit 261 represent a "pulse pot" (typically a gas charged back pulse vessel; see Daniel R. C., et al., 2010, section 3.7). Pulse pots are used more often in gas filtration but can be used with liquids. Valve 25 is a fast-acting valve that discharges liquid to clear the filter. The dislodged particulate material is often directed to another vessel, reservoir or filter for use or disposal.

Chemicals such as cleaning agents, film forming agents, surfactants, or pH adjusting agents can be used to augment backwashing by changing the surface charge or adherence of the filter medium or particulates.

Regarding current filtrations technologies and materials for nuclear fluids, the literature is replete with examples of radiation tolerant filtration medium, usually pleated sintered metal or pleated sintered fiber, or austenitic or other corrosion resistant materials (see Pall, 2018; Porvair, 2018; Mott, 2019). These filters are restricted in differential pressure in normal flow direction (inside to out) and even more restricted in reverse flow (outside to in such as during regeneration)—typically in the range of 45 to 150 psi (3.1 to 10.3 bar). They are almost exclusively porous cylindrical cartridge type filters often with pleated media to increase surface are per unit volume of filter. Traditional pleating, however, is not advantageous with regard to tolerating high pressures of DPs.

Regarding particulate filters and medium, other porous metallic systems are available that can withstand differential pressures as high as 3000 psig (206 bar) (Mott, 2019) and 1850 psid (127 bar) (see Pall, "Unipleat Plus" for high integrity pleat mesh filters 2018; Pall Accusep Selection Guide E78a for multi-tube tubular filters, 2002). Available thick wall tubular filters maintain structural integrity at high DP owing to greater wall thickness and their cylindrical as compared to woven, porous metal or sintered metal thin filter medium in tubular or pleated configurations. However, the flux achievable through these higher-pressure tolerant tubular filters is lower than standard filters and would not be preferable for the first stage of filtration or backwashing as described herein but are suited as the second stage filters as described herein due to lower required flux in the overall filtration process and system described herein. Non suitability of for example multi-tube tubular filters in the first stage is also related to the overall thickness of the medium (much higher than that selected for the in the first stage in the process and system described herein) and its tendency to tightly capture the particle and compress them into a hard filter cake, as well as some inherent geometry restrictions such as penetration of ultrasound to the interior of the tube "bundles" during backwashing in filters like the Pall Accusep multi tube candle filter designs. The configuration of the second stage, however, is not restricted to cylindrical candle type filters but may include cartridge filters, leaf disc filters, a specific design being suitable for higher pressure operation such as are used in the polymer processing industry.

Regarding regeneration, ultrasonic energy is an accepted method of regeneration of porous metal filters at power levels of on the order of 60 watts/gallon for 10 to 60 minutes (see Mott "Porous Metal Filter Elements", 2019). Other references describe ultrasonic cleaning times at ambient pressure of 15 minutes (see Uppili, S., WO 2011/163030, 29 Dec. 2011). Hence for a cleaning process that can last days, weeks, or months, there is little schedule disadvantage to performing backwashing 10 to 30 times over the course of the process. Higher ultrasound densities in terms of watts/gallon can be delivered albeit at the risk of causing cavitation erosion damage to standard filter medium.

Regarding ultrasonic cleaning in general, typical frequencies are in the range of 20 to 150 kHz for conventional ultrasonic cleaning, and up to 1 MHz for mega sonic cleaning, the latter being more amenable to cleaning of small particles in tight crevices or geometries. Mechanisms of cleaning and the role of frequency are described in Busnaina, 1995. Mechanisms include cavitation and imparting forces on fluids by streaming currents which require line of sight between the ultrasonic transducer and the part to be cleaned (or, in this case, regenerated). Ultrasonic energy can pass through solid barriers but at the expense of attenuation of the energy.

Regarding the mechanism of ultrasonic cleaning, the amplitude of the cyclical (often sinusoidal) high frequency pressure waves transmitted through the fluid must be sufficient to overcome the vapor pressure of the fluid (about 0.5 psia 0.034 bar) at 25° C. for water). Accordingly, a component to be cleaned, or a filter to be regenerated by a system submerged in water, such as a submerged filter system wherein submergence is used for radiation shielding purposes, will experience less cavitation events at a given ultrasonic energy level (and corresponding pressure wave) because the hydrostatic head pressure increases the barrier to cavitation. Lowering the pressure of the system will enhance cavitation induced cleaning at a given energy level. Higher frequency ultrasounds are even more impeded by ambient pressure than ultrasonics in the range of 25-150 kHz as described by Busnaina, 1995.

Ultrasonic regeneration can also be incorporated into the apparatus if the apparatus is not submerged by either attaching or contacting the ultrasonic transducer to the filter housing or by inserting an ultrasonic transducer into the center of the fluid filled housing.

With regard to side-effects of ultrasonic energy cleaning as envisioned herein for backwashing, cavitation erosion can compromise the integrity of the filter (housing, filter media, filter medium supports). Accordingly, it is desirable to use cavitation erosion resistant materials for, as a minimum, the medium (see Thiruvengadam, 1964; Szkodo, 2015). Cavitation erosion materials include austenitic stainless steels and other nickel alloys, stainless steel with high molybdenum content, titanium and titanium alloys, or high hardness materials. Coating may also be applied to materials to improve their resistance to cavitation erosion including diamond-like coatings and nitrides (see Aperador, 2014). Processes such as low temperature surface carburization of stainless steels (LTCSS) may be used as they do not adversely interfere with the ductility of the stainless filter material but can significantly improve erosion resistance (see Collins, 2007).

Regarding features of current methods of filtration at nuclear plants, several popular systems are described by the website of Trinuclear Corporation (2019). These systems are single stage and can employ filters in parallel, a concept easily adopted by this invention. Systems available from companies such as Trinuclear are single stage, high flowrate, low differential pressure systems and do not incorporate a high pressure second stage filter that can be used to capture larger quantities of particulates.

Figure 2A:
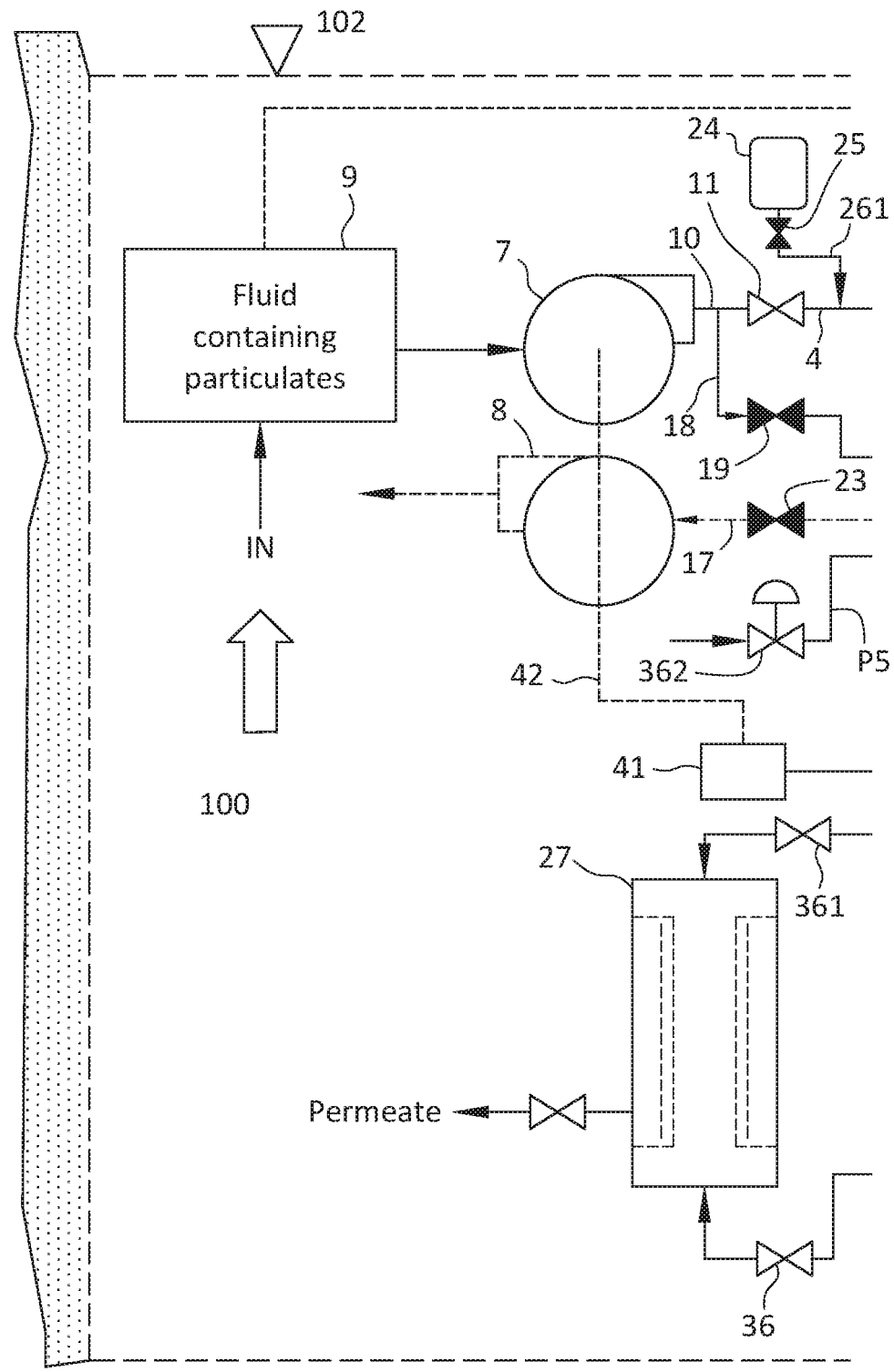
FIGS. 2A and 2B illustrate the main components of embodiments of the apparatus.
Figure 2B:
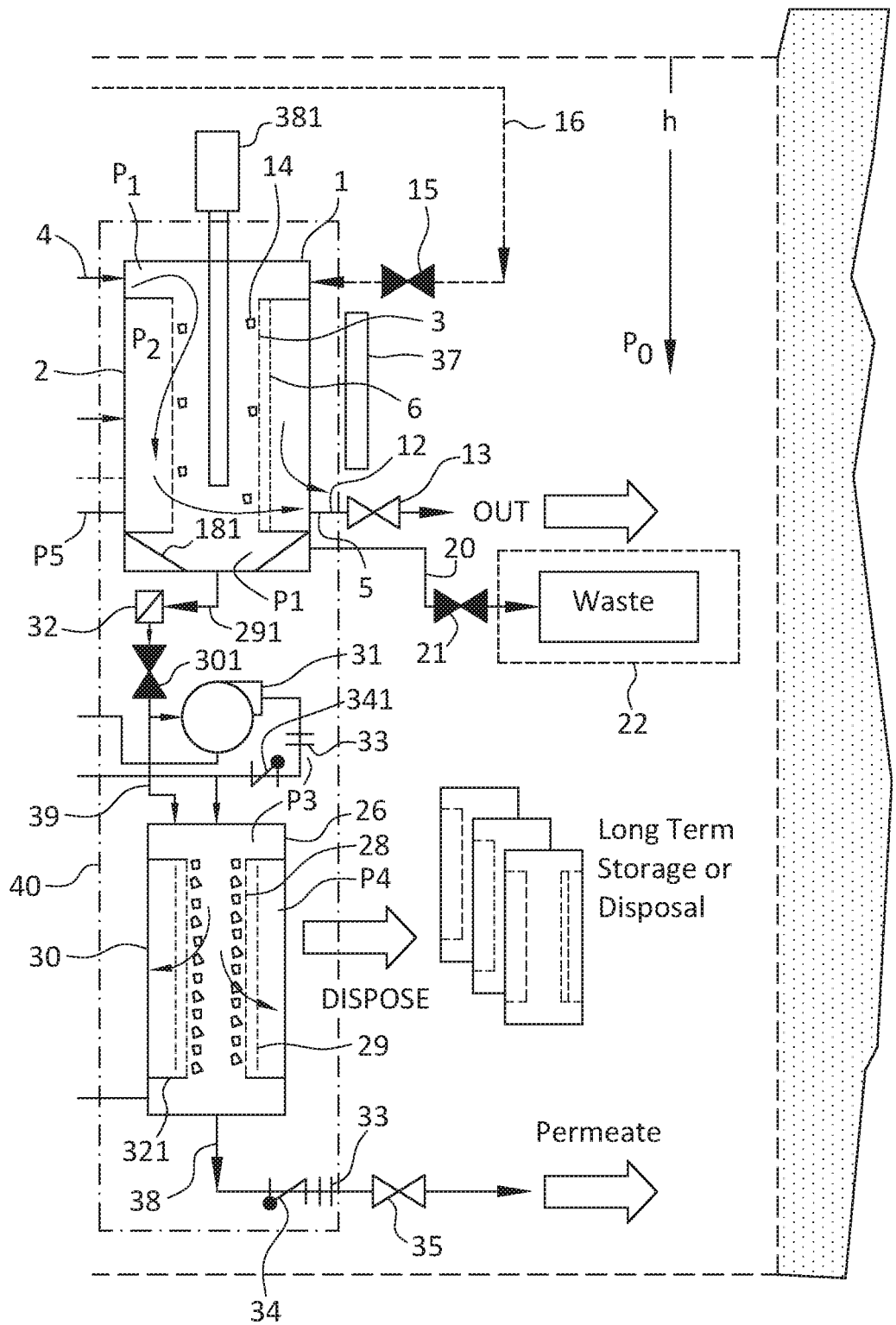

FIGS. 2A and 2B depict embodiments of the apparatus, where FIG. 2B is a continuation of the apparatus of FIG. 2A. The apparatus comprises a first filter 1, including a housing 2 and filter element or elements 3, a fluid inlet 4, and a fluid outlet 5. The filter element may be a porous medium, or layers of porous medium supported by one or more structural features such as a coarse filter or mesh 6. The fluid may be introduced into the first filter via pump 7 or pulled through the filter by pump 8 though valve 15 and conduits 16 and 17, and valve 23. Typical flowrates would be <100 up to 1000 gpm (<23 up to 230 m$^3$/hr), but preferably in the range of 150 to 600 gpm (34 to 138 m$^3$/hr). The discharge pressure of the pump 7 may be in the range of 15 to 100 psig (1-7 bar). Alternatively, the first filter may be supplied by a pressurized source of fluid or by gravity.

The fluid containing particulates is supplied from a source or inventory container 9 to the first filter 1 by pump 7, which pulls the fluid through an input line connected between the source container 9 and the pump 7 via conduits 10 connected between the pump 7 and the first filter 1 with flow control through valve 11. Alternatively, the fluid containing particulates is pulled through the first filter 1 by pump 8—so called suction mode, as defined in the industry, which is used to avoid contamination of pump 7 (see Trinuclear Corporation, 2019). In this case, the fluid containing particulates is pulled via the conduit 16 through valve 15 into the first filter 3, and then through valve 23 via conduit 17. In the case where the fluid containing particulates is pulled through the pump 7, filtrate fluid optionally exits the filter 1 through conduit 12 via valve 13 in the case of release back into an open pool 100 of fluid being treated or can be recycled back through filter 1 (conduits not shown) for subsequent cycles of filtration in the case where the apparatus is submerged below the surface of a pool of aqueous fluid. In the case where the fluid containing particulates is pulled through the first filter 1 by the pump 8, the filtrate fluid exists through an output of the pump 8 to the open pool 100.

Valves 11 and 13 may serve to isolate the filter, for example to retain and capture particulates. Not shown in the figure are conduits or vents that permit draining of the filter, as their placement is within the skill of the ordinary artisan. Not shown in the figure is a configuration of the apparatus where the all parts or a part of the apparatus, such as pumps 7 or 31, are not submerged below the surface of an open pool 100 but still filters the fluid containing particulates and discharge permeate to another location such as a tank, vessel, reservoir of other apparatus such as waste pool 22. One skilled in the art would appreciate that the exact location of the apparatus relative to fluid containing particulates 9 could be application specific, (e.g., on the "deck" by a pool 100 in a nuclear facility, next to a tank of fluid containing particulates or the system to which permeate is transferred, or remote from a tank containing particulates or the system to which permeate is transferred).

During filtration, particulates 14 are captured on the medium 3, where the pore size or "rating" of 3 is chosen to be smaller than at least some and possibly all the particulates. Pore sizes would range from 0.1 to 100 microns, but preferably 0.2 to 5 microns, and most preferably 1 to 5 microns to avoid flow resistance that would compromise the ability to achieve target flowrates if finer porosity filters are used.

Filter 1 may be located underwater in a pool 100 of fluid at depth h below the water level/surface 102. The hydrostatic pressure at the midplane of the filter is $P_0$, where $P_0$ is 7 to 15 psi (about 0.5 to 1 bar) typically representing submergence in about 15-30 feet (4.6 to 9 m) of water; optionally 0 psig (0 Bar) if located near the surface or above a body of water. If the filters would be submerged near the bottom of the pool which is about 30 feet (9 m) deep the pressure would be about 15 psi (1 bar). The pressure on the receiving (particulate laden fluid) side of the filter is $P_1$. If pump 7 is used as source of water, $P_1$ is $P_0$+5 to 15 psi (+0.34 to 1 bar) at the beginning of its life (a clean filter with actual pressure dependent on flow; this value is typical for pleated filters based on the published specs from Pall, 2016) to $P_0$+40 to 150 psig (+2.8 to 10 bar) corresponding to the typical allowable pressure tolerance of the "dirty" filter at which time you would backwash or change the filter 1. The pressure on the completely or partially cleaned fluid side of the filter 1 is $P_2$, so the corresponding pressure drop across the filter 1 is $P_1$-$P_2$ (first filter differential pressure, DP). Pressure $P_2$ is just above $P_0$; its value depends on the pressure loss through conduit 12 and valve 13 that is generally $P_0$+5 to 10 psi (0.34 to 1 bar). Once the first filter DP exceeds a predetermined limit or other criteria are met, such as a limit on radioactivity (or total activity) of the collected particulates, filtration is terminated, and regeneration can be conducted.

In a simple backwashing embodiment, flow is reversed through the filter 1 via conduit 18, valve 19 and out of the filter 1 via conduit 20 through valve 21. Alternatively, the backwashed fluid containing the backwashed particulates can be directed to a waste receiving tank, vessel or other system 22 rather than being sent through the second filter stage through conduit 291. This may be selected as the fluid path for a number of reasons, for example if it is determined that the particulates that a have been collected on filter 1 exhibit a specific radioactivity, for example as measured by a radiation detection device placed adjacent to the filter 1 (a common nuclear industry practice), that is below a level that would fully realize the advantages of the collection and concentration on filter 26 as described in this application. One skilled in the art would appreciate that the specific radioactivity where such a decision to divert the particulates to other system 22 would depend on factors such as the relative disposal costs of filter 26 versus processing the particulates by other waste system 22 (e.g., blending, grouting, encapsulation, and vitrification being among the options commonly available in the nuclear industry), as well as local, state or national laws that pertain to the generation, transport and disposal of nuclear wastes.

Pump 7 can be used to establish and maintain the backwashing flow. Particulates 14 are dislodged by viscous drag forces. Backwashing is terminated using one or more predetermined criteria such as $P_2$-$P_1$ reaching a low steady state value (close to clean DP), or the radioactivity levels if the filter have decreased to a desired point indicative of removal of the collected radioactive particles (radiation detectors adjacent to the filter housing or within the housing or conduits are not shown to simply the figure). Filter 1 may also feature a conical bottom 181 to prevent any retained particulates from settling on horizontal surfaces during backwashing.

In one embodiment, backwashing is assisted by pressure pulses (compressed gas) in reservoir 24 via conduit 261 through opening of valve 25, which may be a "pulse pot" as described above.

A second filter 26 (or filters 26, 27 connected in parallel to one another by valves 36, 361) are used to collect backwashed particulates. Filters stacked in series (not shown) may also be used (e.g. two 3-foot-long (90 cm) sections connected in series- or stacked—to achieve a six-foot-long (1.8 m) filter element). In this embodiment overall, the second filter 26 includes a filter medium 28, optional supporting structures 29, and a housing 30. The medium 28 in the filter 26 may exhibit a pore size or "rating" of between 0.1 and 100 microns, but preferably 0.1 to 1 micron, which is optionally smaller than the preferred pore size of filter 1 for reasons already described and discussed further below. Filter medium 28 may be layers of filter media. The housing 30 and filter medium 28 may be compatible with operating at pressure $P_3$ (inlet pressure) and pressure $P_4$ (outlet pressure). For this high-pressure tolerant filter, $P_3$ could be $P_0$+125 psi (+8.6 bar) or less with an absolutely clean filter. For the clean filter 26, for example, $P_3=P_0$+5 to 15 psi (+0.34 to 1 bar) just like a clean filter 1. In all cases, the value for $P_0$ assumes that both filters are at relatively same depth. In FIGS. 2A and 2B, filters 1, 26 and 27 are not pictured all at the same depth, however, the figure is only representational to show interconnections and does not show the actual placement location of the filters. One ordinarily skilled in art would recognize that actual pressure is depth dependent. $P_4$ typically would be similar to $P_2$ since the first and second filters would likely be packaged together, but this is not a requirement (e.g., filter 26 could be in an entirely different elevation with respect to 102 or location, and be remote from filter 1

The structural design of the filter 26 and the filter medium 28 and support 29 is compatible with pressures $P_3$ and $P_4$, and differential pressure $P_3$-$P_4$ that is much higher than that used as a design basis for filter 1.

One ordinarily skilled in the art would also recognize that flow through filter 26 can be normally arranged as outside to inside if housing 30 is designed to accommodate the full discharge pressure of pump 7 or 31.

Note that the housing 30 and filter 26 are graphically shown to be smaller than filter 1 for illustrative purposes but also to identify that filter 26 is rated for higher differential pressure and higher particulate loading as compared to filter 1 and may indeed be more compact than filter 1 or larger.

Regeneration is achieved by directing flow to filter 26 from filter 1 via conduit 291, valve 301, using pump 31. Alternatively pump 7 may also be used to assist or provide the flow. A coarse debris trap such as a Y strainer 32 can be used to protect pump 31 (typically about 0.5 mm to 1 mm screen traps). Pump 31 is a high-head, low-flow-rate pump. It may a centrifugal pump or a positive displacement pump such as a gear pump, progressive cavity pump, or piston pump, all of which can be designed to be tolerant of particles in the backwashed fluid. The pumping flowrate is typically in the range of 0.5 to 10 gpm (0.12 to 2.3 m³/hr), but preferably about 1-2 gpm (0.23-0.46 m³/hr) which would allow a complete flush of filter 1 in about 2 to 5 minutes assuming a typical volume of a particulate filter used in nuclear facilities (see prior discussion in this specification). The outlet pressure of pump 31 may be in the range of 15 psi to 3000 psi (1 to 206 bar), generally greater than 150 psi (10.3 bar), with a preferred developed head of 1000 to 2000 psi (69 to 138 bar). Pressure may be gradually increased as the filter media is loaded. During backwashing, particulates 321 collect on the filter medium 28. The medium 28 of filter 26 can be smaller than that in filter 1 owing to the higher pressure supplied and lower required flowrate, thereby assuring greater captures of all sizes of particulates. Cleaned fluid permeate is discharged from filter 26 via conduit 38 and valve 35, or from filter 27 through valve 43. Pump 31 can also be bypassed using conduit 39 (isolation valve not shown) especially in the case where pump 7 is providing flow. If additional removal of particles that not captured on filter 26 is desired, such as those exhibiting a particle size less that the rating of filter 26 or those that pass thru filter 26 due to a filter failure (e.g., due to a hole or breach in medium) the permeate may be directed to a downstream stage of filtration.

Filter 26 and 27 can be detached from the system by disconnects at flanges or connectors 33 so that the filters 26 and 27 may be transported away together or individually for long term storage or disposal, with the preferred form factor and dimensions of filters 1, 26 and 27 resembling that of a spent nuclear fuel assembly. Particulates are captured and retained inside filters 26 and 27 by upstream and downstream check valve 341. The overall system can be isolated for instance by closing valves 11, 21, 19, 25, 23, 36, 15, 13, and 35 and valves 361 and 362, and other vents and drains. For illustrative purposes, the figure shows more accumulation of particulate in a thicker filter cake on filters 26 and 27 as compared to filter 1. Filter 1 and filters 26 or 27 may also be separated and deposed of independently.

Ultrasonic energy may be used to enhance backwashing. Ultrasonic transducers may be placed at the very interior of the filter (e.g., a sonotrode 381), or outside with a conventional submersible ultrasonic transducer 37. When a sonotrode 381 is used for ultrasonic energy, it may be removable and able to translate along the axis of the filter 1 centerline to cover the length of the filter 1 should the sonotrode be shorter than the filter. When the ultrasonic transducer is placed at the very interior of the filter, ultrasonic energy is not lost or absorbed by the filter housing or filter medium before disrupting the accumulated particulates. Direct line of sight delivery of the ultrasound also allows cleaning to be achieved by both cavitation and acoustic streaming. The frequency of the ultrasonic energy may be in the range of 20 kHz to 1 MHZ, but most preferable 20 to 40 kHz. Nominal energy density inside Filter 1 may be 60 watts per gallon but may be 200 watts per gallon (1 gallon=3.785 l) or higher. Higher energy density may improve cleaning but increases the risk of damage to the filter, including the filter medium, by cavitation erosion. As described earlier, cavitation resistant materials and coating can be used/applied to improve the integrity of the medium. In particular, the filter 1 may comprise at least one filter layer that has been coated with cavitation resistant materials. Alternatively, at least one filter layer in the filter 1 may have a cavitation resistant coating. Examples of such materials and coatings are discussed previously.

In a further embodiment, ultrasonic disruption of the particulates accumulated on filter 1 may be enhanced by operating pump 31 but partially closing valve 36 which throttles flow to filter 1 at pressure $P_5$ which is below $P_0$, hence eliminating the burden on the ultrasonics of overcoming hydrostatic head and cavitation threshold for a submerged filter system (typical submerged depths in pools 100 are similar to depths of spent fuel pool or up to 30 ft deep or more). In reduced pressure operation of filter 1, $P_5$ could be no less than 0.4 psia (0.03 bar) (vapor pressure of water at 25° C.) but can be anything less than $P_0$ (say from 30 psia (15 psig, 1 bar) to as low as about 1 psia (0.07 bar absolute)) to improve ultrasonic regeneration.

While FIGS. 2A and 2b show several individual parts and components, the apparatus can be configured in an integral package 40 (shown in a dot-dashed line) to simplify deployment and transport.

Finally, the power required to drive pumps 7 and 31 may be similar so that one motor or drive, preferably a variable speed drive 41, could be used to provide the motive force to both pumps 7 and 31, for example on a single shaft 42.

Not shown in the figures, but understandable by one skilled in the art, are the instruments that may be incorporated in the system including pressure transducers, gauges or transmitters; flow meters or flow totalizers; radiation monitors to assess filter loading or backwashing efficiency; or operators and controllers for pumps and valves.

Having now fully described this invention, it will be appreciated by those skilled in the art that the same can be performed within a wide range of equivalent parameters, concentrations, and conditions without departing from the spirit and scope of the invention and without undue experimentation.

While this invention has been described in connection with specific embodiments thereof, it will be understood that it is capable of further modifications. This application is intended to cover any variations, uses, or adaptations of the inventions following, in general, the principles of the invention and including such departures from the present disclosure as come within known or customary practice within the art to which the invention pertains and as may be applied to the essential features hereinbefore set forth as follows in the scope of the appended claims and any combinations of the various disclosed embodiments as may be appropriate.

All references cited herein, including journal articles or abstracts, published or corresponding U.S. or foreign patent applications, issued U.S. or foreign patents, or any other references, are entirely incorporated by reference herein, including all data, tables, figures, and text presented in the cited references. Additionally, the entire contents of the references cited within the references cited herein are also entirely incorporated by references.

Reference to known method steps, conventional methods steps, known methods or conventional methods is not in any way an admission that any aspect, description or embodiment of the present invention is disclosed, taught or suggested in the relevant art.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

I claim:

1. A multistage apparatus for filtering a fluid to remove radioactive particulates from the fluid comprising:
   a re-usable first stage filter consisting of a first filter housing and a first radiation resistant and cavitation erosion resistant porous filter element, where the first filter housing and the porous filter element are designed to withstand an internal pressure of up to 150 psid, a particulate-laden fluid supply means consisting of a first inlet conduit accommodating a flow rate of <150 to 600 gpm, said supply means being fluidically connected to a region inside the porous filter element, through which fluid flows and upon which particulates are collected, and a particulate-free fluid discharge means consisting of a first outlet conduit, said first outlet conduit fluidically connected to the region outside of the porous filter element, with the first inlet conduit and the first outlet conduit collectively providing the first filtration flow path used during filtration of a fluid containing radioactive particulates;
   means of periodically regenerating the first stage filter by supplying backwashing fluid to the first stage filter at 1 to 10 gpm with a second inlet conduit fluidically connected to the region inside of the first stage filter housing and outside of the first porous filter element; and a backwashed fluid and particulate discharge means consisting of a second outlet conduit fluidically connected to the region inside of the first porous filter element upon which radioactive particulates have been filtered, the second inlet conduit and the second outlet conduit collectively providing a second backwash flow path for fluid through the first stage filter used during backwashing of captured radioactive particulates;
   a second stage filter consisting of a second filter housing and a second radiation resistant porous filter element designed to withstand a differential pressure of up to 3000 psid across the second porous filter element, a particulate-laden backwash fluid supply means consisting of a third inlet conduit forming a flow path for fluid and particulates backwashed from the first stage filter, said flow path accommodating flow rates from 1 to 10 gpm, and said supply means being fluidically connected through the wall of the second filter housing) to the region inside of the second porous filter element, through which fluid flows and upon which backwashed particulates are captured, and a particulate-free fluid discharge means consisting of a third outlet conduit, said third outlet conduit fluidically connected through the second filter housing) wall to the region outside of the second porous filter element, said second stage filter including flanges or connectors used to detach and remove the second stage filter from the multistage filtration apparatus;
   a pumping system comprising a pump between the first stage filter and the second stage filter fluidically connected to the first stage filter with the second outlet conduit and to the second stage filter via the third inlet conduit, said pump designed to provide fluid at a pressure between 150 and 1000 psig and at a flow rate between 1 to 10 gpm; and
   at least one ultrasonic transducer incorporated into the first stage filter assembly.

2. The multistage apparatus of claim 1, further comprising a pump upstream of the first stage filter, said pump discharge fluidically coupled to a source of fluid containing radioactive particulates and fluidically coupled to the first stage filter with a fourth conduit used during filtration and the second inlet conduit used during backwashing regeneration.

3. The multistage apparatus of claim 1, further comprising a pump downstream of the first stage filter, said pump suction fluidically coupled to the first stage filter with a fifth conduit used during filtration.

4. The multistage apparatus of claim 1, wherein the ultrasonic transducer is disposed interior to the first filter housing.

5. The multistage apparatus of claim 4, wherein the frequency of the ultrasonic energy is in the range of 20 kHz to 1.0 MHz.

6. The multistage apparatus of claim 4, wherein the frequency of the ultrasonic energy is in the range of 20 to 40 KHz.

7. The multistage apparatus of claim 1, wherein the first porous filter element is made of a cavitation resistant material selected from a group consisting of an austenitic stainless steel and other nickel alloys, a stainless steel with high molybdenum content, a titanium, and a titanium alloy.

8. The multistage apparatus of claim 1, wherein the surface of the first porous filter element is coated with at least one cavitation resistant layer or coating deposited on the first porous filter element, selected from diamond-like coatings or nitrides, or modified to achieve a cavitation resistant layer at the surface by use of low temperature carburization of a stainless-steel filter medium.

9. The multistage apparatus of claim 1, wherein the first filter element comprises pore sizes ranging from 0.1 to 100 microns.

10. The multistage apparatus of claim 1, wherein the first filter element comprises pore sizes ranging from 0.2 to 5 microns.

11. The multistage apparatus of claim 1, wherein the first filter element comprises pore sizes ranging from 1 to 5 microns.

12. The multistage apparatus of claim 1, wherein the second filter element comprises pore sizes ranging from 0.1 to 100 microns.

13. The multistage apparatus of claim 1, wherein the second filter element comprises pore sizes ranging from 0.1 to 1 micron.

14. The multistage apparatus of claim 1, further equipped with at least one of pressure transducers, gauges or transmitters; flow meters or flow totalizers; radiation monitors to assess filter loading or backwashing efficiency; operators and controllers for pumps and valves.

15. A method of separation and containment of radioactive particulate materials suspended in aqueous liquids or solutions using the apparatus of claim 1, the method comprising:
flowing a fluid containing radioactive particulates through a re-usable first stage filter, said first stage filter consisting of a first filter housing and a first radiation resistant and cavitation erosion resistant porous filter element, the fluid passing through the first stage filter along the filtration flow path;
monitoring filtration flowrate and pressure in the first stage filter and differential pressure across the first porous filter element;
optionally reducing the flow rate through the first stage filter before the allowable differential pressure limit is reached;
terminating flow through the first stage filter when the pressure in the first stage filter or across the first porous filter element approaches or reaches a maximum pressure rating of the first stage filter or differential pressure rating of the first porous filter element;
regenerating the first stage filter for reuse by backwashing the first stage filter along the backwash flow path while providing ultrasonic energy to a surface of the first porous filter element upon which radioactive particulates have been separated and contained;
directing the particulate laden backwash fluid to a second stage filter, the second stage filter consisting of a second filter housing) and a second radiation resistant porous filter element, using a pump to increase fluid pressure between 150 and 1000 psig;
ceasing or terminating backwashing of the first stage filter after observing that a pressure drop across the second stage filter has stabilized or after a predetermined time limit has been reached;
resuming filtering of the fluid through the first filter;
monitoring filtration flow rate and differential pressure through the first stage filter after resuming filtration;
repeating regeneration of the first stage filter by repeating backwashing;
repeating filtration and periodic backwashing operations from the first stage filter to the second stage filter until an internal pressure in the second stage filter approaches or reaches a maximum pressure rating of the second porous filter element;
replacing the second stage filter and storing or disposing of the second stage filter if either a maximum pressure rating of the second stage filter has been approached or reached, or until a radioactivity of accumulated radioactive material in the second stage filter reaches a predefined limit in curies, said replacement performed by removing the second stage filter through disengaging the filter at upstream and downstream couplings and installing a new clean second stage filter.

16. The method of claim 15, further comprising performing filtration at <150 to 600 gpm along the filtration flow path through the first stage filter.

17. The method of claim 15, further comprising performing the backwashing at 1 to 10 gpm along the backwash flow path through the second stage filter.

18. The method of claim 15, further comprising reducing pressure in the fluid adjacent to a surface of the first filter element upon which radioactive particulates have been separated and contained by partially closing an inlet valve.

19. The method of claim 15, further comprising supplying ultrasonic energy from outside the first filter housing exterior to the first stage filter or from inside an interior of the first filter housing to the first filter element.

20. The method of claim 15, further comprising using the second stage filter until a radiation resistance limit of the second filter medium is approached or exceeded.

* * * * *